United States Patent
Demmel et al.

(10) Patent No.: US 6,290,635 B1
(45) Date of Patent: Sep. 18, 2001

(54) DEVICE FOR FOLDING A WEB OF MATERIAL

(75) Inventors: Joerg Demmel, Stuttgart; Andreas Levermann, Gerlingen; Siegfried Rapp, Murr, all of (DE)

(73) Assignees: Fraunhofer Gesellschaft zur Foerderung der Angewandten Forschung E.V., Munich; Filterwerk Mann & Hummel GmbH, Ludwigsburg, both of (DE)

( * ) Notice: Subject to any disclaimer, the term of this patent is extended or adjusted under 35 U.S.C. 154(b) by 0 days.

(21) Appl. No.: 09/284,631

(22) PCT Filed: Oct. 4, 1997

(86) PCT No.: PCT/EP97/05453

§ 371 Date: Jun. 18, 1999

§ 102(e) Date: Jun. 18, 1999

(87) PCT Pub. No.: WO98/17573

PCT Pub. Date: Apr. 30, 1998

(30) Foreign Application Priority Data

Oct. 18, 1996 (DE) .............................................. 196 43 071

(51) Int. Cl.[7] ..................................................... B31B 1/26
(52) U.S. Cl. ........................ 493/399; 493/433; 493/360; 156/73.1
(58) Field of Search .................................. 493/60, 64, 58, 493/340, 365, 463, 241, 399, 430, 433; 53/DIG. 2; 128/206; 156/73.1; 210/448; 264/322, 23

(56) References Cited

U.S. PATENT DOCUMENTS

| | | | |
|---|---|---|---|
| 3,392,843 | * 7/1968 | Mumby | 210/448 |
| 3,660,186 | * 5/1972 | Sager et al. | 156/73.1 |
| 4,265,842 | * 5/1981 | Summo | 264/23 |
| 4,333,978 | * 6/1982 | Kocher | 156/73.1 |
| 4,713,132 | * 12/1987 | Abel et al. | 156/73.1 |
| 4,778,441 | * 10/1988 | Couturier | 493/433 |
| 5,089,202 | * 2/1992 | Lippold | 264/322 |
| 5,167,740 | * 12/1992 | Michaelis et al. | 156/73.1 |
| 5,701,893 | * 12/1997 | Kern et al. | 128/206 |

* cited by examiner

*Primary Examiner*—Peter Vo
*Assistant Examiner*—Louis K. Huynh
(74) *Attorney, Agent, or Firm*—Crowell & Moring, L.L.P.

(57) ABSTRACT

An apparatus and method for producing a zig-zag folded filter element from a web of material (18), which is supplied through a feeding device to a stamping unit (10). To define the folding line, the stamping unit is fitted with an anvil roll (21) and a stamping die (24), the stamping unit being ultrasound activated and thereby improving the stamping operation.

5 Claims, 2 Drawing Sheets

DEVICE FOR FOLDING A WEB OF MATERIAL

BACKGROUND OF THE INVENTION

The invention relates to a device for folding a web of material.

U.S. Pat. No. 4,778,441 discloses an apparatus for folding a web of material. It consists essentially of an embossing roller which has concave and convex embossing elements as well as a matching counter roller. The paper to be embossed is guided between the two rollers.

Also disclosed in German OS 42 01 288 is a method and a machine for producing pleats on paper, filter material or other such media. This method also operates with a pair of notched rollers with indenting knives and anvils. Variable pleating can be produced by controlling them accordingly.

A device which produces zig-zag folded filter elements is disclosed in U.S. Pat. No. 3,514,354. Here two star rollers are provided which emboss and simultaneously fold the paper. Conveyor belts follow the star rollers to guide the pleated element into a shaping apparatus.

A disadvantage in the known embossing or pleating devices is that, in some of the materials to be processed, the embossing action is not sufficient to achieve a precise folded edge. It is especially disadvantageous that mechanical embossing by means of cylinders above a certain maximum speed results in poorer results as regards the embossing action.

SUMMARY OF THE INVENTION

The invention therefore is addressed to the problem of avoiding the aforementioned disadvantages and providing a device for folding a web of material, which will achieve a high folding output and even in the case of different materials will emboss them sufficiently to enable them to be pleated.

This object is achieved by the invention described and claimed hereinafter.

It is known to perform a welding of laminated materials or nonwoven materials by ultrasound. It is also known to cut nonwoven materials or paper by the ultrasound method. In the case of the method of the invention, however, neither a cutting process nor a welding process is carried out.

The substantial advantage of the invention is that supporting the embossing action with ultrasound improves the embossing action and shorter cycle times are achieved. By the input of energy by ultrasound, especially when synthetic fiber nonwoven materials are used, plastification is produced in the area of the fold line by the heat that is produced.

It is possible, of course, to provide vibrations of other frequencies instead of ultrasound, or to directly bring about heating in the area of the fold line by means of heating elements.

An advantage of the use of ultrasound is also to be seen in the fact that is can be applied precisely at the desired position. Energy consumption is thus low, and the amount of energy applied can be very well controlled.

In accordance with one embodiment of the invention the embossing unit comprises at least one anvil roller with an appropriately designed shape and a sonotrode. This sonotrode is a part of an oscillating structure with which the necessary energy can be applied to and act upon the web of material.

In another embodiment of the device, two embossing units are to be used. With these the material web can be embossed on both sides and a zig-zag folded element can be formed. After the material is provided with the embossing, it passes on to a receiving unit or set-up unit. Here the pleating is performed by the fact that, for example, the web of material is introduced into revolving spindles. These spindles permit a precise establishment of the spacing between folds.

An advantageous embodiment of the invention envisions making the anvil rolls or the sonotrodes modular, so that they can be quickly exchanged and an adaptation to the desired embossing structure will be very easy to achieve. A method for producing a pleated element provides, according to the invention, for feeding a web of material through a feeder to an embossing unit. Ultrasound is simultaneously applied to the embossing unit to assist the embossing action. With this method it is possible to produce a filter element from different materials, especially also from synthetic nonwoven material, which can be produced in an economical manner.

In another embodiment of the invention, a synthetic resin element composed of active carbon or doped with active carbon is embossed, thus producing a filter element which in addition to particles, also absorbs air pollutants and gases.

These and other features of preferred embodiments of the invention will be found not only in the claims but also in the description and the drawings, it being possible for the individual features to be realized individually or together in the form of sub-combinations in embodiments of the invention and in other fields, and may represent advantageous and independently patentable embodiments for which protection is hereby claimed.

BRIEF DESCRIPTION OF THE DRAWINGS

The invention will be explained in further detail with reference to working embodiments.

DETAILED DESCRIPTION OF PREFERRED EMBODIMENTS

Figure 1:
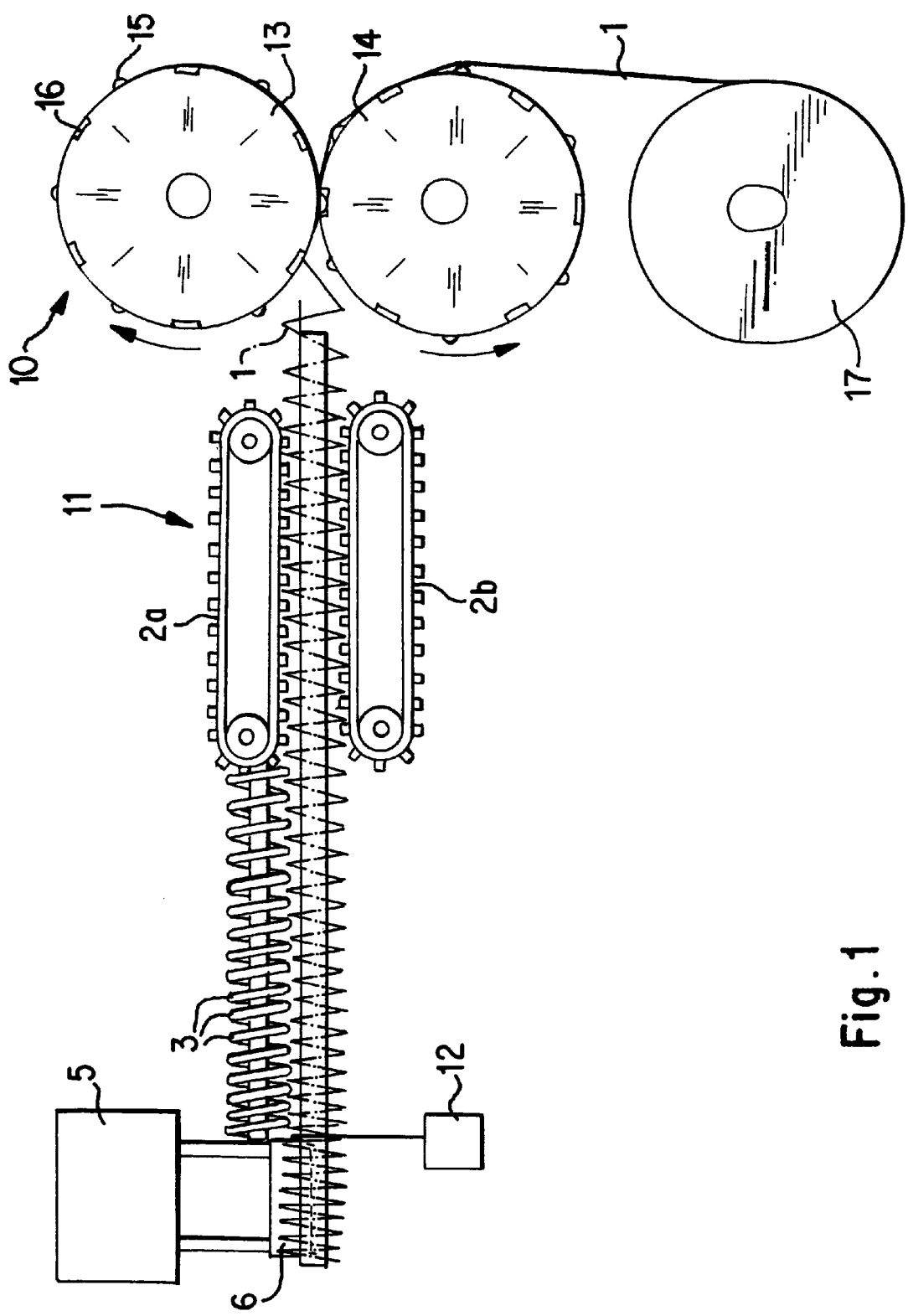
FIG. 1 shows a schematic layout of a device for folding a web of material.

In the schematic diagram of the device in FIG. 1 an endless web 1 of filter material is shown. This is initially embossed in an embossing station 10. The embossing station 10 is comprised of two anvil rolls 13 and 14 which are equipped with embossing punches 15 and anvils 16. The filter material web 1 unwound from a roll 17 is thereby provided on alternating sides with a crease. The web of filter material passes from the embossing station 10 into the sphere of influence of a folding station 11, namely between two cogbelts 2 a and 2 b which fold the embossed web 1 in a defined manner. After the cogbelts the pleated web 1 is conveyed in a defined manner in a worm screw 3. This worm screw 3 has a variable pitch and can gather the pleated material together with a certain spacing between pleats. At the end a severing device 12 separates the individual filter elements which are delivered by a comb-like element 6 to a transfer station 5. The embossing punches 15 arranged on the embossing rollers 13 and 14 are each provided with a sonotrode or are constructed in the form of sonotrodes and are excited by an ultrasound generator. The sonotrode or the embossing punch thus produces—through a friction effect and local heating—a plastification of the web composed of a nonwoven material and hence a contour corresponding to a rippled profile.

Figure 2:
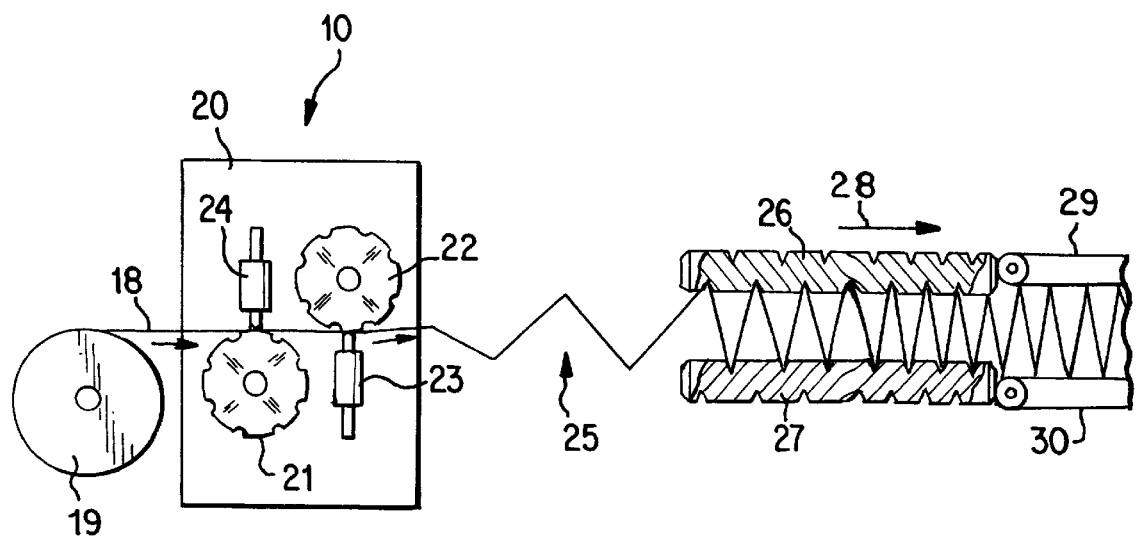
FIG. 2 shows a schematic layout of another working embodiment of a device for folding a web of material.

FIG. 2 shows a schematic illustration of an apparatus which is a variant of the apparatus shown in FIG. 1. A web 18 of filter material is conveyed from a roll 19 to an embossing module 20. This embossing module is comprised of anvil roller 21 and anvil roller 22, as well as the sonotrodes 23 and 24 as part of a so-called oscillating structure. As the web passes through it, the sonotrodes emboss it at the intended places, so that thereafter a fold is formed in the area 25. In order to define the pleat spacing, two spindles 26 and 27 are provided, into which the web passes. These spindles have a diminishing pitch, so that the distance between pleats decreases in the direction of the arrow 28. After the final distance between pleats is established at the right-hand end of the spindles, the web is transferred to two conveyor belts 29 and 30. These conveyor belts carry the filter material web to a packaging and cutting apparatus, not shown here.

Figure 3:
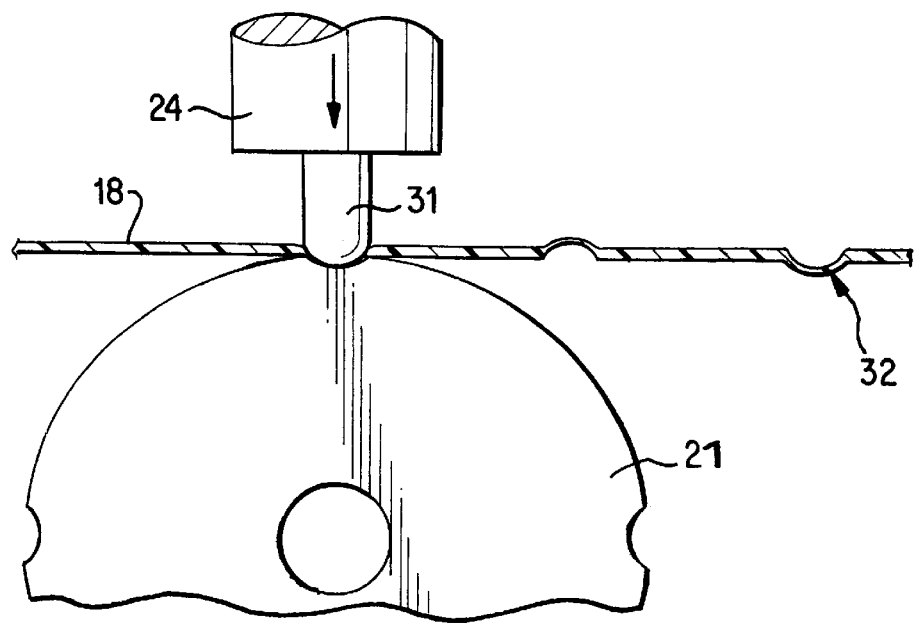
FIG. 3 shows a detail view of a sonotrode.

FIG. 3 shows on an enlarged scale the principle of the ultrasound-aided embossing. Here are represented a sonotrode 24 and the anvil roller or anvil 21 through which the filter material web 18 is moved. During the transport of the filter material, the application of ultrasound at the tip 31 of the sonotrode 24 causes a brief heating of the web within a defined area and thus leads to a permanent deformation. This permanent deformation forms the crease locations 32. The size of the gap between the sonotrode and the embossing roller 21 can be made variable and thus can be optimally adapted to the web of filter material. It is also possible to emboss material coated with active carbon or material doped with active carbon. Here, again, the variability as regards the embossing depth is advantageous, especially when materials are used in which active carbon is embedded in a kind of multi-layer arrangement and damage to these layers must be avoided.

The steps in the process of manufacturing a pleated filter element are:

The weakening of the material with the aid of ultrasound and thus also the simultaneous warming of the material, thereafter the setting up of the filter material web in spindles or conveyor belts, and then the fixing of the filter element by appropriate known measures such as beads of glue, side strips, or the like.

If a material doped with active carbon is used, the ultrasound process makes it possible to reduce the size of the active carbon particles at the crease. This has the advantage on the one hand that damage to the material is avoided and on the other hand that the crease location can be very accurately defined even when active carbon particles are used.

It is advantageous to adjust the ultrasound action and thus the warming of the material at the crease location so that, in the case of a polyester nonwoven material, a localized warming of about 110 to 120° C. occurs. This heating above the glass transition temperature results in a lasting deformation, while the crease nevertheless remains plastic.

What is claimed is:

1. An apparatus for folding a web of material, said apparatus comprising a web feeder for feeding the web of material, at least one embossing unit for defining fold lines on the web of material, and at least one sonotrode associated with the at least one embossing unit for applying ultrasound to the web to assist an embossing action of the embossing unit, wherein the at least one embossing unit comprises an anvil roller having an embossing contour and an embossing punch or knife, wherein said embossing punch or knife is constructed as a sonotrode, said apparatus further comprising a set-up unit following the embossing unit, said set up unit comprising two parallel cogbelts for receiving the embossed web between them and folding the web along the embossed fold lines to form a zig-zag folded filter element from the material web.

2. An apparatus according to claim 1, comprising first and second embossing units, said first embossing unit embossing the web of material from one side, and said second embossing unit embossing the web of material from the opposite side, and wherein ultrasound is applied to both embossing units.

3. An apparatus according to claim 1, wherein at least one of the anvil roller and the sonotrode is modularly exchangeable.

4. A method for producing a zig-zag folded filter element from a web of material, said method comprising the steps of:

feeding the web of material to an embossing unit comprising at least one anvil roller and at least one embossing punch;

embossing the web of material in the embossing unit to define fold lines on the web of material; and applying ultrasound to the embossing unit to support the embossing; said method further comprising the steps of receiving the embossed web in a set-up unit comprising two parallel cogbelts and folding the web of material between said cogbelts in the set-up unit along the embossed fold lines to form a zig-zag folded filter element from the web of material.

5. A method according to claim 4, wherein said web of material is selected from the group consisting of paper, synthetic fiber nonwoven webs, and synthetic resin elements doped with active carbon.

* * * * *